United States Patent
Alameh et al.

(10) Patent No.: US 10,506,650 B1
(45) Date of Patent: Dec. 10, 2019

(54) METHODS AND SYSTEMS FOR PAIRING ELECTRONIC DEVICES BASED UPON PROXIMITY

(71) Applicant: Motorola Mobility LLC, Chicago, IL (US)

(72) Inventors: Rachid Alameh, Crystal Lake, IL (US); Eric Krenz, Crystal Lake, IL (US); Zhengping Ji, Hinsdale, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/195,474

(22) Filed: Nov. 19, 2018

(51) Int. Cl.
*H04W 76/14* (2018.01)
*H04W 4/80* (2018.01)
*H04W 4/02* (2018.01)

(52) U.S. Cl.
CPC ........... *H04W 76/14* (2018.02); *H04W 4/023* (2013.01); *H04W 4/80* (2018.02)

(58) Field of Classification Search
CPC ....... H04W 76/14; H04W 4/023; H04W 4/80; H04W 24/02; H04W 76/10; H04B 3/544; H04B 7/18558; H04B 17/18
See application file for complete search history.

(56) References Cited

U.S. PATENT DOCUMENTS

| | | |
|---|---|---|
| 9,913,230 B1 | 3/2018 | Tyagi et al. |
| 2011/0028091 A1 | 2/2011 | Higgins et al. |
| 2013/0222137 A1 | 8/2013 | Alameh et al. |
| 2014/0160962 A1* | 6/2014 | Lehtinen ............... H04W 52/22 370/252 |
| 2014/0247807 A1* | 9/2014 | Westerberg ........... H04W 36/34 370/331 |
| 2014/0370817 A1* | 12/2014 | Luna ..................... H04W 8/005 455/41.3 |
| 2015/0173022 A1 | 6/2015 | Black et al. |
| 2015/0271432 A1 | 9/2015 | Muth |
| 2016/0262191 A1* | 9/2016 | Flynn .................... H04W 76/10 |
| 2016/0337809 A1 | 11/2016 | Narasimha |
| 2017/0171699 A1 | 6/2017 | Jin |
| 2017/0208430 A1* | 7/2017 | Tsuchida ............... H04W 4/027 |
| 2017/0208448 A1 | 7/2017 | Zhu |
| 2018/0042050 A1* | 2/2018 | Kim ...................... H04W 88/08 |
| 2018/0069726 A1* | 3/2018 | Ohhira .................... H04L 12/46 |
| 2018/0167812 A1* | 6/2018 | Nagarajamoorthy ........ H04W 12/06 |

(Continued)

OTHER PUBLICATIONS

Nguyen, Tu , "NonFinal OA", U.S. Appl. No. 15/484,598, filed Apr. 11, 2017; dated Aug. 15, 2017.

(Continued)

*Primary Examiner* — Andrew Wendell
(74) *Attorney, Agent, or Firm* — Philip H. Burrus, IV (57) ABSTRACT

A device includes a wireless communication circuit and one or more processors operable with the wireless communication circuit. The wireless communication circuit receives one or more local area wireless communication signals identifying one or more external electronic devices operating within an environment of the device. The one or more processors select a local area wireless communication signal having a power magnitude experiencing a highest amount of change from the one or more local area wireless communication signals and perform a pairing operation with an external device identified by the local area wireless communication signal.

20 Claims, 6 Drawing Sheets

(56) References Cited

U.S. PATENT DOCUMENTS

2018/0227070 A1* 8/2018 Suh .................. H04L 25/26
2019/0037470 A1* 1/2019 Yeh .................. H04W 40/244
2019/0082378 A1* 3/2019 Dziurda ............. H04W 48/04

OTHER PUBLICATIONS

Nguyen, Tu , "Notice of Allowance", U.S. Appl. No. 15/484,598, filed Apr. 11, 2017; dated Nov. 27, 2017.

* cited by examiner

METHODS AND SYSTEMS FOR PAIRING ELECTRONIC DEVICES BASED UPON PROXIMITY

BACKGROUND

Technical Field

This disclosure relates generally to electronic devices, and more particularly to electronic devices with wireless communication capabilities.

Background Art

Mobile electronic devices, such as smartphones, are becoming ubiquitous. These devices sometimes offer increased functionality when in communication with other electronic devices across a network. It would be advantageous to have improved methods and systems for establishing communication with other electronic devices.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to measuring changes in received power when performing one or more of discovering other electronic devices, pairing with other electronic devices, or communicating with other electronic devices to elect one electronic device for discovering, pairing, or communication. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or wireless communication technology, improve the functioning of the electronic device itself by solving wireless communication problems arising exclusively in the wireless communication field.

It will be appreciated that embodiments of the disclosure described herein may be comprised of one or more conventional processors and unique stored program instructions that control the one or more processors to implement, in conjunction with certain non-processor circuits, some, most, or all of the functions of detecting a highest change in received power as another electronic device approaches to select the device delivering the highest change, per unit of time, for a pairing or other communication operation as described herein. The non-processor circuits may include, but are not limited to, a radio receiver, a radio transmitter, signal drivers, clock circuits, power source circuits, and user input devices. As such, these functions may be interpreted as steps of a method to perform power consumption control in an electronic device during wireless communications. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Many modern electronic devices are being produced without visible displays. Voice assistant devices, wireless loudspeaker devices, set top boxes, network routers, some desktop computers, and other devices seldom include a visible display. While not including a display, these devices invariably require network connectivity for proper operation. Illustrating be example, to play music from a smartphone on a wireless loudspeaker, either the smartphone will need to be paired with the wireless loudspeaker, or each of the smartphone or wireless loudspeaker will need to be paired with a wireless communication intermediary, such as a router or Bluetooth.sup.™ device. Since there is no display, it can often be difficult to select which device to pair or manipulate settings and controls in such devices, as it can be challenging to know where in the pairing process one is when that process requires a series of steps.

Embodiments of the disclosure advantageously provide a solution to this problem by providing simple, intuitive methods and systems for selecting an electronic device with which to perform a discovery, pairing, or communication operation. In one or more embodiments, a wireless communication circuit of an electronic device receives local area wireless communication signals from one or more external electronic devices operating within an environment of the electronic device.

When more than one signal is received, one or more processors in the electronic device determine a change in a power magnitude, across a predefined amount of time, of local area wireless communication signals received from the external electronic devices. Embodiments of the disclosure contemplate that the change in power magnitude of energy received, per unit of time, dramatically increases as an external device moves toward an electronic device. While the change in power magnitude may initially increase as the inverse of the distance squared changes, when the external electronic device gets close enough the exponential increases. Thus, the change in the power magnitude may increase as the inverse of the distance cubed, the inverse of the distance to the fourth power, and so forth. Accordingly, if three external electronic devices are in a room with an electronic device, and two are stationary while one is moving rapidly toward the electronic device, the change in power magnitude received from the one moving rapidly toward the electronic device will dramatically increase, while the change in the power magnitude from the other electronic devices remains effectively zero.

As such, in one or more embodiments the one or more processors of the electronic device identify an external electronic device delivering a wireless communication signal exhibiting a maximum change in power magnitude across time (maximum change per time interval). It should be noted that this measured rate of change in power amplitude per predefined interval of time could be due to a device to be paired moving toward a host device, or conversely due to the host device being moved toward a device to be paired. It matters not which device is moving, but rather that the distance between the two devices is getting shorter. Regardless of which device is moving, where this change in the power magnitude is positive, the one or more processors of the electronic device cause the wireless communication device to perform a pairing operation with the external electronic device delivering the wireless communication signal exhibiting the maximum change in power magnitude measured as a rate of change in power amplitude per predefined interval of time.

Advantageously, a person who wants to pair a wireless loudspeaker with a smartphone can simply move the wireless loudspeaker toward the smartphone. Regardless of what other external electronic devices are operating within the environment of the smartphone, when this occurs, one or more processors will detect a significant increase in power magnitude across a particular time interval from the wireless loudspeaker while changes in power magnitudes from other external electronic devices are lower or are zero. For instance, if the smartphone makes a one-second power measurement every two seconds, in each repeated measurement the magnitude of the power across the one second interval will be larger than the last. The one or more processors of the smartphone can then automatically, as a function of detecting the rate of change in power magnitude, e.g., a rate of change in amplitude per designated time interval, from the wireless loudspeaker being the maximum, identify the wireless loudspeaker as one with which a discovery, pairing, or communication operation should be performed. In this illustration, the one or more processors could cause the wireless communication device of the smartphone to perform a pairing operation with the wireless loudspeaker.

It should be noted that embodiments of the disclosure are not directed to determining which external electronic device operating within the environment of an electronic device delivers the highest amount of absolute power to the electronic device. Said differently, embodiments of the disclosure do not merely make a Received Signal Strength (RSS) measurement, a Received Signal Strength Indication (RSSI) measurement, a Reference Signal Received Power (RSRP) measurement, or other measurement. Instead, embodiments of the disclosure measure a change in power, which can be one of these measurements or another, per predefined interval of time. Embodiments of the disclosure contemplate that some devices, such as routers, may always transmit more power than, say, a wireless loudspeaker. Thus, if only raw power measurements were used, the router would always deliver more power than the loudspeaker. However, by measuring a change in RSS, RSSI, RSRP, or other levels measured as a rate of change in power amplitude per predefined interval of time, embodiments of the disclosure can determine which one changes the most during a predefined time duration. This change in power across a designated time interval is what indicates the movement of an external electronic device toward the electronic device, not absolute power.

In one or more embodiments, a confirmation of the selection can be required. Illustrating by example, one or more sensors of the smartphone may detect a confirmation operation after identifying the wireless loudspeaker as having a maximum change in power magnitude measured as a rate of change in power amplitude per predefined interval of time. One example of a confirmation operation is a touch along a touch sensor. Thus, a user may identify the wireless loudspeaker as the device with which the smartphone should perform the pairing operation my moving the wireless loudspeaker toward the smartphone and then touching a touch sensitive surface of the smartphone. Other examples of confirmation operations include stopping the movement of the external electronic device toward the electronic device, speaking audible commands to the electronic device, or combinations thereof. Still other examples of confirmation operations will be obvious to those of ordinary skill in the art having the benefit of this disclosure.

Figure 1:
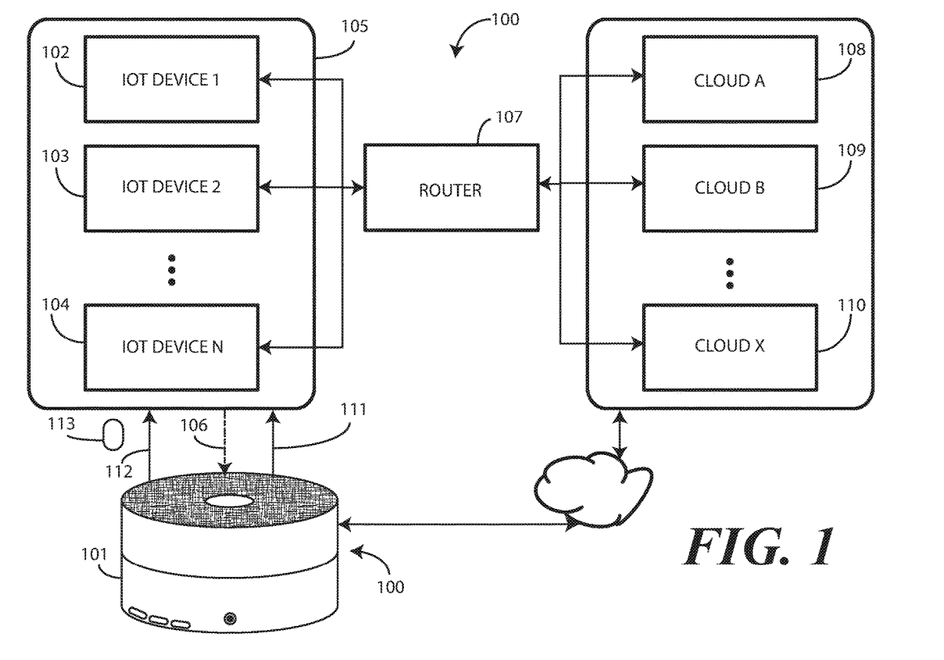
FIG. 1 illustrates one explanatory system in accordance with one or more embodiments of the disclosure.

Turning now to FIG. 1, illustrated therein is one explanatory system 100 configured in accordance with one or more embodiments of the disclosure. In one embodiment, the electronic device 100 is configured as an Internet of Things (IoT) hub. Where so configured, the electronic device 100 includes a communication circuit configured for wired or wireless communication with various devices, as well as one or more processors that are operable with the communication device. The electronic device 100 can be operable with, and can control, IoT devices that are in communication with the communication circuit. For example, the electronic device can receive inputs and/or control settings from one or more IoT devices, and can control the IoT devices in response to internally created or externally received commands.

As used herein, an IoT device is an electronic device having a unique identity, and which is configured for wireless and/or wired communication across a network such as a local area network or a wide area network such as the Internet. Each IoT device can include its own circuitry, including processor(s), memory device(s), user interfaces, control circuits, and/or output device(s) that perform a function in response to control signals from the IoT hub and/or relative to users and/or mobile devices communicating with the IoT devices.

It should be noted that the electronic device 101 is configured as an IoT hub for illustration and explanatory purposes. While an IoT hub is one example of an electronic device configured in accordance with one or more embodiments of the disclosure, the methods and systems described herein are suitable for use for any number of other electronic devices. The methods and systems described herein are particularly well suited for electronic devices that are devoid of visible displays. In this illustrative embodiment, the electronic device 101 is devoid of a display.

Figure 2:
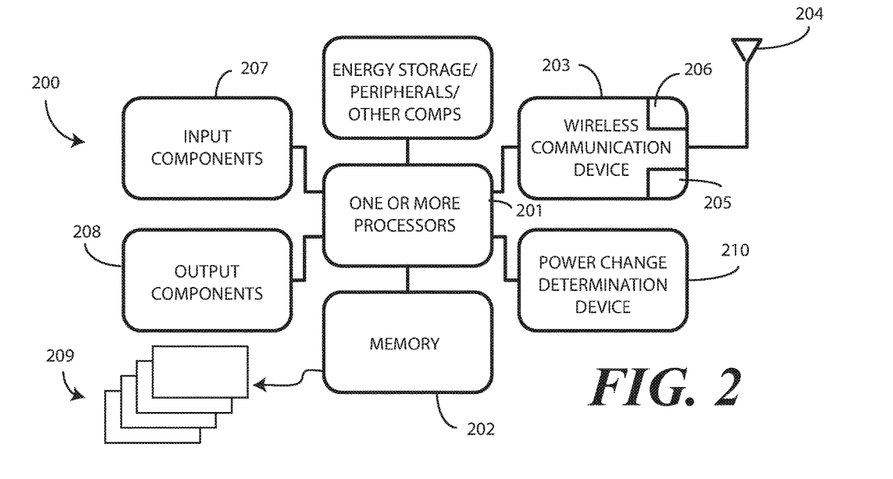
FIG. 2 illustrates one explanatory schematic block diagram of one explanatory electronic device in accordance with one or more embodiments of the disclosure.

Turning briefly to FIG. 2, illustrated therein is one explanatory schematic block diagram 200 of electronic device (100). In one embodiment, the electronic device (100) includes one or more processors 201. The one or more processors 201 are operable with the various components of the electronic device (100). The one or more processors 201 can include a microprocessor, a group of processing components, one or more ASICs, programmable logic, or other type of processing device. The one or more processors 201 can be configured to process and execute executable software code to perform the various functions of the electronic device (100).

A storage device, such as memory 202, can optionally store the executable software code used by the one or more processors 201 during operation. The memory 202 may include either or both static and dynamic memory components, may be used for storing both embedded code and user data. The software code can embody program instructions and methods to operate the various functions of the electronic device devices configured in accordance with embodiments of the disclosure, and also to execute software or firmware applications and modules. The one or more processors 201 can execute this software or firmware, and/or interact with modules, to provide device functionality.

The one or more processors 201 can be responsible for performing the primary functions of the electronic devices configured in accordance with one or more embodiments of the disclosure. Executable software code used by the one or more processors 201 can be configured as one or more modules 209 that are operable with the one or more processors 201. Such modules 209 can store instructions, control algorithms, and so forth.

In this illustrative embodiment, the schematic block diagram 200 also includes a wireless communication circuit 203 that can be configured for wired or wireless communication with one or more other devices or networks. The wireless communication circuit 203 can include wireless communication circuitry, one of a receiver, a transmitter, or transceiver, and one or more antennas 204. In one or more embodiments, the wireless communication circuit 203 is capable of communicating with one or more remote devices across a wide area network, local area network, small local area network (piconet), or personal area networks.

Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks. Examples of local area networks include HomeRF, Bluetooth.sup.™, and IEEE 802.11 (a, b, g or n) or other similar Wi-Fi networks. Examples of ad hoc peer-to-peer networks include the one-hop and two-hop communication networks, with the former being referred to as a "piconet."

In one or more embodiments, the wireless communication circuit 203 can include a local area network front end 205 and a wide area network communication front end 206. The local area network front end 205 can be configured to communicate using multiple types of local area network communication protocols. For example, the local area network front end 205 can include both a Wi-Fi circuit and another local area wireless communication circuit. The Wi-Fi circuit can, in one embodiment, communicate via an IEEE 802.11 protocol, while the other local area wireless communication circuit can, in one embodiment, communicate with a communication protocol other than the 802.11 standard.

In one or more embodiments, the local area network front end 205 is configured to operate in accordance with a predefined discovery protocol by an electronic device (100) can search for other devices. In one or more embodiments, when operating in a discovery mode using the discovery protocol, the wireless communication circuit 203 can scan for devices that broadcast their identities in accordance with the predefined discovery protocol, i.e., at predefined times, on predefined channels, and in accordance with predefined communication protocol parameters. In one or more embodiments, communications under the predefined discovery protocol occur at the application layer of the stack.

One example of such a communication protocol with such a predefined discovery protocol is the Bluetooth.sup.™ communication protocol. When operating in the predefined discovery protocol, Bluetooth.sup.™ devices execute one or more steps that include broadcasting a local device name, as well as storing the names of remote devices received in accordance with the protocol. The Bluetooth.sup.™ discovery protocol can also include filtering and processing device names. These filtered and/or processed device names can then be further processed by the one or more processors 201 in accordance with one or more method steps.

While Bluetooth.sup.™ is one explanatory communication protocol suitable for use with embodiments of the disclosure, embodiments are not so limited. Any local area network communication protocol that includes a predefined device discovery protocol operating at the application layer of the stack can be substituted and used with method steps and system components set forth here. Illustrating by example, in another embodiment the predefined device discovery protocol employs broadcast SSID data in a Wi-Fi network. In yet another embodiment, the predefined device discovery protocol comprises a Radio Frequency Identification (RFID) protocol. Accordingly, other such communication protocols will be obvious to those of ordinary skill in the art having the benefit of this disclosure.

In one or more embodiments the one or more processors 201 can cause the wireless communication circuit 203 to execute a discovery protocol to establish communications with another electronic device. The one or more processors 201 can cause the wireless communication circuit 203 to execute pairing processes to pair other electronic devices to the electronic device 100. The one or more processors 201 can cause the wireless communication circuit 203 to execute communication operations with other electronic devices as well.

The one or more processors 201 can also be operable with other components. The other components can include input components 207, such as a touch sensor, an acoustic detector, one or more microphones, image capture devices, or other input devices. The input components 207 can also include one or more proximity sensors to detect the presence of nearby objects. The input components 207 may include video input components such as optical sensors, mechanical input components such as buttons, touch pad sensors, touch-sensitive surfaces, capacitive sensors, motion sensors, and switches. Similarly, the other components can include output components 208 such as audio and/or mechanical outputs. Other examples of output components 208 include audio output components such as speaker ports or other alarms and/or buzzers and/or a mechanical output component such as vibrating or motion-based mechanisms. The other components may further include an accelerometer to show vertical orientation, constant tilt and/or whether the device is stationary.

A power change determination circuit 210 can be configured to determine a change in a power magnitude of local area wireless communication signals received from external devices. In one or more embodiments, the power change determination circuit 210 can measure a power magnitude or power level associated with one or more local area wireless communication signals received by the wireless communication circuit 203. Illustrating by example, the power change determination circuit 210 can, in one or more embodiments, perform a RSS measurement, a RSSI measurement, a RSRP measurement, or other measurement. Thereafter, the power change determination circuit 219 can perform a plurality of additional RSS measurements, a plurality of additional RSSI measurements, a plurality of additional RSRP measurements, or a plurality of additional other measurements to determine how the measurement changes across a predetermined amount of time.

For example, in one embodiment the power change determination circuit 210 makes a plurality of RSS measurements across a period of ten seconds. By comparing each of the plurality of RSS measurements across this time period, the power change determination circuit 210 can determine how much the RSS of a particular local area wireless communication signal has changed during a selected time interval. This process can continue across a desired period or set of periods to allow the power change determination circuit 210 to compare the various changes in power magnitude per unit of time for all received local area wireless communication signals to determine which has the maximum change across an amount of measured time. As will be described in more detail below, the one or more processors 201 can then identify an external electronic device having a local area wireless communication signal experiencing the highest change in power magnitude across an amount of measured time as one with which the electronic device (100) should pair. Accordingly, from this highest change in power magnitude during a given time interval, where that change is positively increasing, i.e., the external electronic device is moving toward the electronic device (100) and not away from it, the one or more processors 201 can cause the wireless communication circuit 203 to perform a pairing operation with the external electronic device.

It is to be understood that the electronic device (100) of FIG. 1 and the schematic block diagram 200 of FIG. 2 are provided for illustrative purposes only and for illustrating components of explanatory electronic devices configured in accordance with one or more embodiments of the disclosure. Neither figure is intended to represent a complete schematic diagram of the various components required for an electronic device. Therefore, other electronic devices in accordance with embodiments of the disclosure may include various other components not shown in FIG. 2, or may include a combination of two or more components or a division of a particular component into two or more separate components, and still be within the scope of the present disclosure.

Turning now back to FIG. 1, as shown, one or more external electronic devices 102,103,104 are operating within an environment 105 of the electronic device 101. Here the external electronic devices 102,103,104 are each configured as IoT devices. Some examples of IoT devices include controllable lights and light fixtures, smart television sets, smoke alarms, electronic thermostats, security systems, camera systems, entertainment systems, plumbing systems, HVAC systems, appliances, culinary devices, and so forth. Numerous other IoT devices will be obvious to those of ordinary skill in the art having the benefit of this disclosure. Also, as the numbers and types of IoT devices continue to expand, embodiments of the disclosure contemplate that new features and enhancements will be developed with which IoT devices can interact with mobile devices or adapt their behavior depending on commands received from the IoT hub.

In one or more embodiments, the electronic device 100 operating as the IoT hub is devoid of any display. Since the IoT hub does not have a display, it can be difficult to efficiently pair new IoT devices with the hub. Moreover, when multiple new IoT devices need to be paired with the IoT hub, it can be inconvenient to select one over another due to the lack of a display from which to select a particular device. While it may be possible to introduce a third device having a display, such as a smartphone, to "mediate" the pairing process, this is inconvenient and removes the ability for the IoT hub or new IoT device to be marketed with the desirable "pair without a phone" designation.

Accordingly, embodiments of the disclosure provide for a proximity-triggered method using a local area network communication signal 106, such as a Wireless Fidelity (Wi-Fi) signal profile received from, for example, an IoT device to select the IoT device for pairing and setup while filtering out, i.e., not selecting, other IoT devices operating within the environment of an IoT hub.

In one or more embodiments, this is a two-step process. First, the IoT hub detects a maximum change in a power magnitude of energy received from an IoT device during a measured interval window due to that IoT device being moved toward the IoT hub. Second, a user optionally performs a confirmation operation to confirm that a pairing operation should occur. As noted above, and as will be described below with reference to FIG. 4, examples of pairing operations include stopping the motion of the IoT device moving toward the IoT hub, delivering touch input to a touch sensor of the IoT hub, speaking an audible command to the IoT hub, or combinations thereof. Still other examples of confirmation operations will be obvious to those of ordinary skill in the art having the benefit of this disclosure.

In this illustration, the electronic device 101 is in communication with one or more of the external electronic devices 102,103. In one or more embodiments, the electronic device 101 receives one or more local area wireless communication signals from the external electronic devices 102,103 while in operation.

In this illustration, the external electronic devices 102,103 are also in communication with remote electronic devices 108,109,110 across a network through a communication hub 107, shown here as a router. These remote electronic devices 108,109,110 can be "cloud" servers that deliver data through the communication hub 107 to effect services at the various external electronic devices 102,103. Illustrating by example, remote electronic device 108 may be a cloud-based, music streaming service that delivers music through the communication hub 107 to external electronic device 102, which may be a wireless loudspeaker in one instance. In this example the electronic device 101, operating as an IoT hub, acts as a control gateway for each of the external electronic devices 102,103 by connecting each external electronic device 102,103 to the proper remote electronic device 108, 109,110, where applicable. The electronic device 101 also delivers control signals 111 to the external electronic devices 102,103 to control the same. These control signals 111 can cause the external electronic devices 102,103 to start functioning, cease functioning, select content for delivery, adjust settings such as volume, brightness, contrast, treble, and bass, and so forth.

Figure 3:
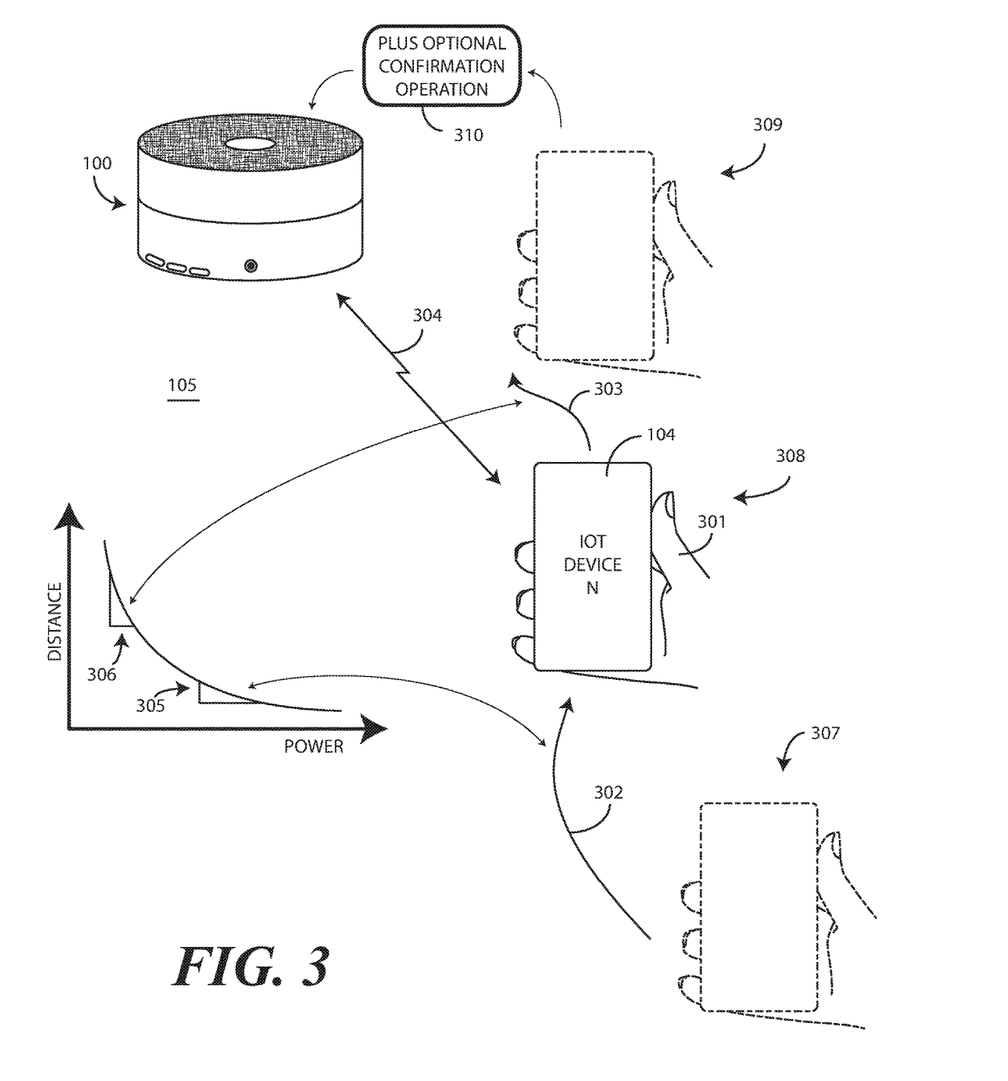
FIG. 3 illustrates one explanatory electronic device, operating in accordance with one or more method steps, each in accordance with one or more embodiments of the disclosure.

In this example, external electronic device 104 is a new device that a user has purchased and placed within the environment of the electronic device 100. External electronic device 104 has not yet been paired with electronic device 101. However, the user desires to "pair" and/or share data or credentials with external electronic device 104 with electronic device 100. In one or more embodiments this pairing or data sharing process includes engaging, with a wireless communication circuit of electronic device 100, in a pairing procedure to establish a peer-to-peer wireless communication link with external electronic device 104. Turning now to FIG. 3, illustrated therein are one or more method steps for performing this pairing operation.

As shown in FIG. 3, external electronic device 104 is operating within an environment 105 of electronic device 100. Desiring to pair the external electronic device 104 with electronic device 100, a user 301 is moving 302,303 the external electronic device 104 toward electronic device 100 in accordance with embodiments of the disclosure.

While this occurs, electronic device 100 receives, with its wireless communication circuit, one or more local area wireless communication signals 304 from the external electronic device 104. Only one external electronic device, i.e., external electronic device 104, is shown in FIG. 3 for ease of illustration. However, were there more external electronic devices operating within the environment 105, the wireless communication circuit of electronic device 100 would receive multiple local area wireless communication signals from these external electronic devices.

As the external electronic device 104 is moving 302,303, the power change determination circuit of electronic device 100 determines changes 305,306 in power magnitudes of the received local area wireless communication signal 304 during a measurement window. As the external electronic device 104 moves closer to electronic device 100, these changes 305,306 increase rapidly, and at an increasing rate compared to when device separation was larger. Illustrating by example, the change 305 in power magnitude across a predefined amount of time while the external electronic device 104 moves 302 from a far location 307 from the electronic device 100 to a mid-distance location 308 from the electronic device 100 is far smaller than the change 306 in power magnitude across the same predefined amount of time while the external electronic device 104 moves 303 from the mid-distance location 308 to a near location 309 from the electronic device 100.

In one or more embodiments, the received local area wireless communication signals 3043 comprise Wi-Fi signals. Accordingly, the power change determination circuit of electronic device 100 is looking for a maximum "rate of change" in received Wi-Fi power to select an external electronic device with which to pair by selecting the local area wireless communication signal experiencing a highest change in power magnitude, measured as a rate of change in power amplitude per predefined interval of time, and then identifying the external electronic device, here external electronic device 104, that is delivering the local area wireless communication signal 304. After this selection, the electronic device 100 can perform a pairing operation with external electronic device 104.

Advantageously, the rate of change of detected power from the external electronic device 104 can be used to sort which external electronic device is closer than others as the user 301 approaches electronic device 100 with external electronic device 104. This is true regardless of which external electronic device transmits with the highest absolute power. Embodiments of the disclosure do not rely upon absolute power because each external electronic device may emit different amounts of power. As such, embodiments of the disclosure rely upon changes in power magnitude measured as a rate of change in power amplitude per predefined interval of time.

At far-field distances, e.g., when the external electronic device 104 is at the far location 307, the power of the local area wireless communication signal 304 varies as the external electronic device 104 moves 302 as a function of $1/r^2$, where "r" is the distance between the electronic device 100 and the external electronic device 104. Accordingly, moving 302 the external electronic device 104 nearer to electronic device 100 will result in a higher relative increase in power during a time measurement interval at electronic device 100 than for external electronic devices that are farther from electronic device 100.

However, as the external electronic device 104 moves to the mid-distance location 308, which can be in the range of thirty centimeters depending upon device size, the exponent on this distance changes. In particular, the exponent increases to a value higher than two. Accordingly, the relative change in detected power becomes even more pronounced. In this way, electronic device 100 can interact with the user 301 in real time to identify external electronic device 104 with which further action should be taken.

With external electronic device 104 identified, electronic device 100 can perform a discovery, pairing, or communication operation with external electronic device 104. Illustrating by example, in one embodiment electronic device 100 can share network or communication credentials, e.g., a router password. Once electronic device 100 is paired with external electronic device 104, the IoT hub can control external electronic device 104 using associated applications retrieved from clouds servers, and so forth.

Embodiments of the disclosure contemplate that the local area wireless communication signals 304 are received by electronic device 100 directly from external electronic device 104, and not through an intermediate device such as a router. Continuing the example of sharing network or communication credentials during pairing, if external electronic device 104 had delivered signals to electronic device 100 through a router rather than directly, external electronic device 104 would already be paired with electronic device 100 through the router and would neither need to be paired again nor receive the network or communication credentials.

As an alternative to electronic device 100 detecting changes in received power across time, in other embodiments the external electronic device 104 could broadcast its output power level. When electronic device 100 receives these transmissions, one or more processors of electronic device 100 would be able to calculate a link margin corresponding to the distance between electronic device 100 and external electronic device 104. In one embodiment when electronic device 100 is so close to external electronic device 104 that the two are almost touching, electronic device 100 should measure a power level similar to the broadcast level. When levels are close, electronic device 100 could initiate a pairing, discovery, or communication operation with external electronic device 104.

Embodiments of the disclosure contemplate that when the user 301 is at the far location 307, power received by electronic device 100 from external electronic device 104 will follow the Friis transmission formula, generally given as follows:

$$P.sub.R = P.sub.T * ((G.sub.R * G.sub.T * \lambda.sup.2)/((4*\pi).sup.2 * r.sup.2)) \quad \text{EQ. 1}$$

where P.sub.T is the transmission power of external electronic device 104, G.sub.R and G.sub.T are the antenna gains of receive and transmit antennas, respectively, is the operating wavelength, and r is the distance separating receiver from transmitter. Assuming the transmit power of each device remains constant during the movement 302,303 of the user 301, and that all respective antenna gains remain constant, the power that electronic device, 100 receives from each external electronic device can be expressed as a simple constant relationship with distance, as below:

$$P.sub.R, n = K.sub.n/((r.sub.n).sup.2), \text{ where } K \text{ is an integer } (1, 2, 3, \text{ etc.}) \quad \text{EQ. 2}$$

Writing the ratios of final and initial received powers at the user's location for each device gives the following:

$$R.sub.1 = P.sub.(R,1,f)/P.sub.(R,1,i) = K.sub.1*(r.sub.(1,i)).sup.2/K.sub.1*(r.sub.(1,f)).sup.2 = (r.sub.(1,i)/r.sub.(1,f)).sup.2 \quad \text{EQ. 3}$$

and $$R.sub.2 = P.sub.(R,2,f)/P.sub.(R,2,i) = K.sub.2*(r.sub.(2,i)).sup.2/K.sub.2*(r.sub.(2,f)).sup.2 = (r.sub.2,i/r.sub.2,f).sup.2 \quad \text{EQ. 4}$$

where i and f denote initial and final values, respectively, before and after the user's movement. The ratio of these ratios is written as follows:

$$\text{metric} = R.sub.1/R.sub.2 = ((r.sub.(1,i)*r.sub.(2,f))/(r.sub.(1,i)*r.sub.(2,f)))/.sup.2 \quad \text{EQ. 5}$$

From FIG. 3, the following is clear:

$$R.sub.(2,i) = r.sub.(1,i) + D \quad \text{EQ. 6}$$

and $$R.sub.(2,f) = r.sub.(1,f) + D$$

where D is the initial distance between the devices. Thus:

$$\text{Metric} = [(r.sub.(1,i)*(r.sub.(1,f)+D))/(r.sub.(1,f)*(r.sub.(1,i)+D))].sup.2 \quad \text{EQ. 7}$$

Further, since:

$$r.sub.(1,f) = r.sub.(1,i) + d \quad \text{EQ. 8}$$

where d is the change in distance from the initial position of a device to the final position of that device, then:

$$\text{metric} = [(r.sub.(1,i)*(r.sub.(1,i)+d+D))/((r.sub.(1,i)+d)*(r.sub.(1,i)+D))].sup.2 \quad \text{EQ. 9}$$

which yields $$[(r.sub.(1,i).sup.2 + (d+D)*r.sub.(1,i))/(r.sub.(1,i).sup.2 + (d+D)*r.sub.(1,i) + d*D)].sup.2 \quad \text{EQ. 10}$$

Where both d and D are positive, as geometrically postulated, this metric is always less than one. By monitoring whether this metric is less or greater than one, it is thus possible for the one or more processors of electronic device 100 to determine which external electronic device is closer as user 301 moves 302,303 that external electronic device toward electronic device 100. It should be noted that this will be true for any other inverse-distance relationship, even with an exponent different than 2, as can be seen in EQ. 10. Thus, for example, if the user 301 enters the near location 309 with multiple external electronic devices, the metric set forth by EQ. 10 will still enable the one or more processors of electronic device 100 to differentiate which one is closer.

In one or more embodiments, after the one or more processors of electronic device 100 have identified external electronic device 104 as delivering the local area wireless communication signal 304 experiencing the highest change in power magnitude for a selected duration, a confirmation operation 310 is required prior to performing any control operation such as performing a discovery operation with external electronic device 104, performing a pairing operation with external electronic device 104, performing a communication operation with external electronic device 104, or performing another operation with external electronic device 104. This confirmation operation 310, where included, provides a secondary check to ensure such a control operation should be performed.

Figure 4:
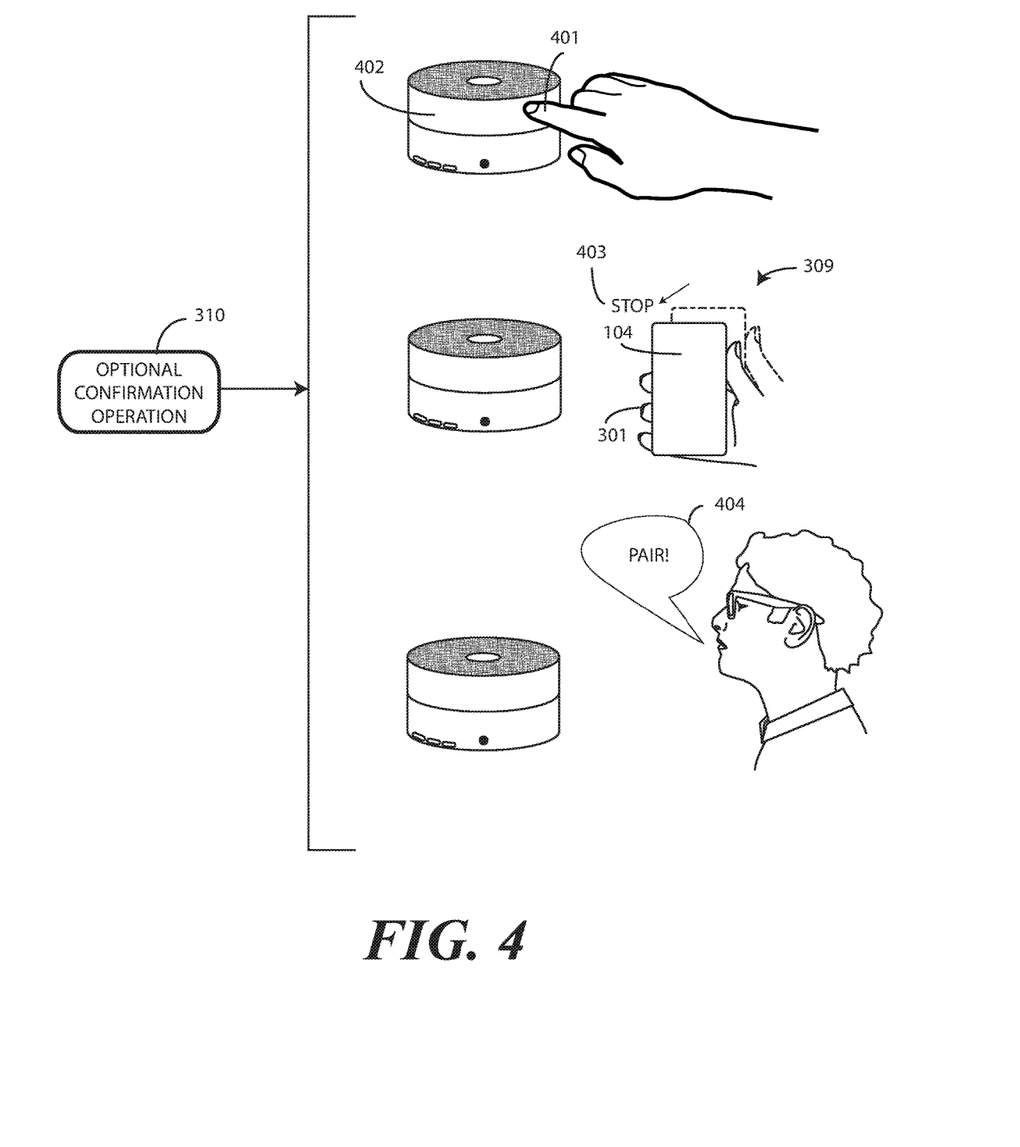
FIG. 4 illustrates one explanatory electronic device, operating in accordance with one or more method steps, each in accordance with one or more embodiments of the disclosure.

Turning now to FIG. 4, illustrating therein are three different examples of confirmation operations 310. Other examples will be obvious to those of ordinary skill in the art having the benefit of this disclosure. In one or more embodiments, the electronic device 100 performs a control operation only when the confirmation operation 310 is detected.

In a first embodiment, the confirmation operation 310 comprises receiving touch input 401 at a touch sensor of the electronic device 100. Thus, in one embodiment the electronic device 100 performs a control operation with an external electronic device selected as delivering a local area wireless communication signal experiencing a highest change in power magnitude when measured for a particular period only after receiving the touch input 401.

In another embodiment, the confirmation operation 310 comprises detecting a cessation of the change in the power magnitude of the one local area wireless communication signal. This can be caused when the user 301 ceases 403 moving the external electronic device 104 at the near location 309. Thus, in one embodiment the electronic device 100 performs a control operation with an external electronic device 104 selected as delivering a local area wireless communication signal experiencing a highest change in power magnitude across time only after detecting the cessation of the change in the power magnitude. Thus, in this example, in addition to detecting a highest rate of change for external electronic device 104, electronic device 100 also detects that the user 301 has "stopped moving" when reaching electronic device 100. This confirms the device selection by electronic device 100, and further eliminates potential issues of the user 301 passing closer to other devices before reaching the electronic device 100.

In a third embodiment, the confirmation operation 310 comprises receiving voice input 404 at an audio sensor, such as a microphone, at the electronic device 100. Thus, in one embodiment the electronic device 100 performs a control operation with an external electronic device selected as delivering a local area wireless communication signal experiencing a highest change in power magnitude per period measurement only after receiving the voice input 404.

Turning now briefly back to FIG. 1, once the pairing operation has occurred, other operations can occur. Illustrating by example, in this embodiment electronic device 100 delivers 112 network communication credentials 113 to external electronic device 104. In this illustration, the network communication credentials 113 comprise a password or authentication code that enables external electronic device 104 to communicate with communication hub 107. Other examples of additional operations will be obvious to those of ordinary skill in the art having the benefit of this disclosure.

Figure 5:
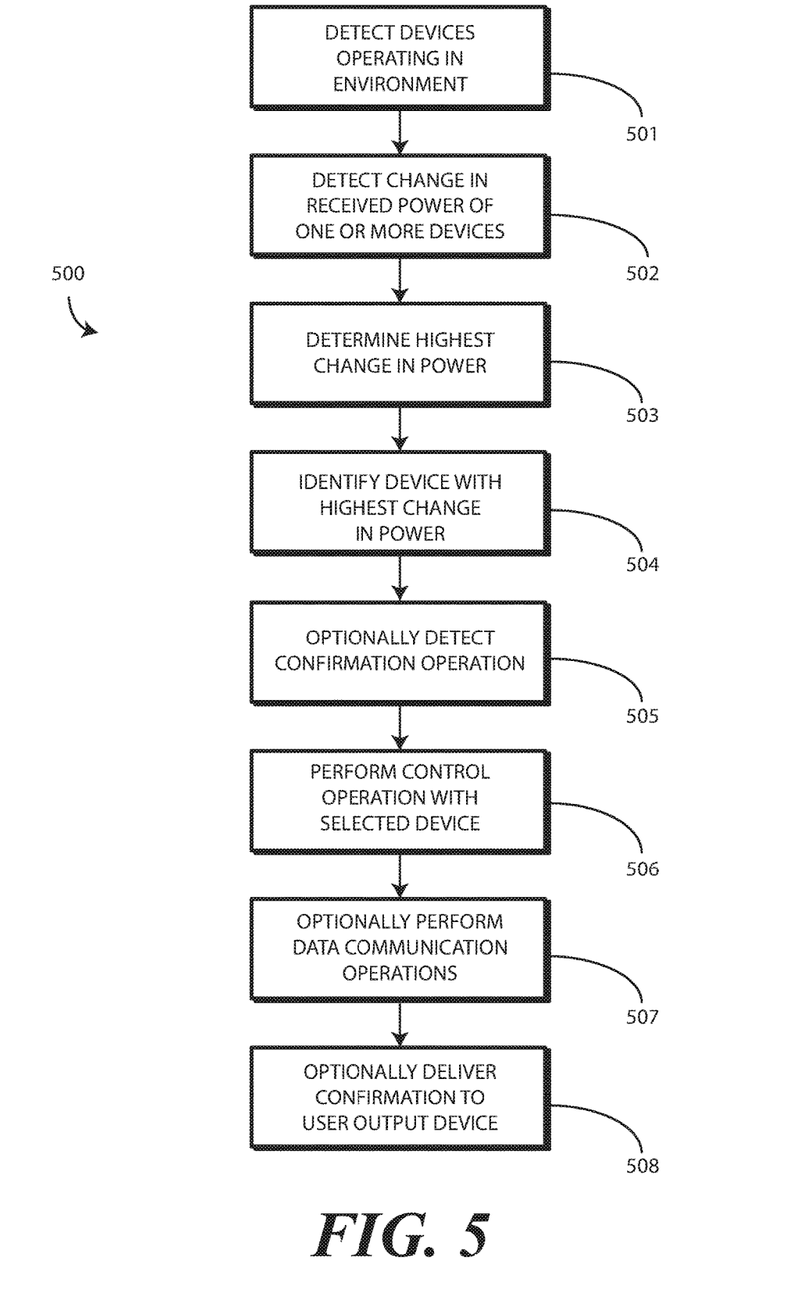
FIG. 5 illustrates one explanatory method in accordance with one or more embodiments of the disclosure.

Turning now to FIG. 5, illustrated therein is one explanatory method 500 in accordance with one or more embodiments of the disclosure. Beginning at step 501, the method 500 detects one or more external electronic devices operating within an environment of an electronic device. In one or more embodiments, this detection occurs by receiving one or more local area wireless communication signals from one or more external electronic devices operating within the environment of the electronic device.

At step 502, the method 500 includes detecting that a power magnitude of at least one local area wireless communication signal is changing across an amount of time. This can be done, in one or more embodiments, as described above with reference to FIG. 3. Where multiple external electronic devices are operating within the environment of the electronic device, step 502 can comprise detecting that power magnitudes of multiple received local area wireless communication signals are changing in a measurement window. In other embodiments, the device may not be already transmitting radio frequency signals. In this case, it can be made to transmit radio frequency signals by the other device, such as when user presence is detected by either device via sound, vibration, light, thermal, camera, etc.

At step 503, the method comprises determining an amount of change in the power magnitude of at least one local area wireless communication signals across an amount of time. Where multiple external electronic devices are operating within the environment of the electronic device, step 503 can comprise determining the amount of change in the power magnitudes of each received local area wireless communication signal across the amount of time.

At step 504, the method 500 includes identifying at least one external electronic device delivering a local area wireless communication signal that is experiencing a change in power magnitude across a period of time. Where multiple external electronic devices are operating within the environment of the electronic device, step 504 can comprise identifying an electronic device delivering a local area wireless communication signal that is delivering a highest change in power magnitude across time, and in particular the highest rate of change in power amplitude per predefined interval of time. Said differently, where the power magnitudes of a plurality of local area wireless communication signals are changing, step 504 can include selecting a local wireless area communication signal experiencing a highest change from the plurality of local area wireless communication signals as the one local area wireless communication signal.

At step 505, the method 500 includes optionally detecting a confirmation operation after identifying occurring in step 504. In one embodiment, the confirmation operation comprises touch input received at a touch sensor. In another embodiment, the confirmation operation comprises a cessation of the change in the power amplitude across a time measurement interval of the local area wireless communication signal selected at step 504. In still another embodiment, the confirmation operation comprises audio input received at a microphone or other audio input device. Still other examples of confirmation operations will be obvious to those of ordinary skill in the art having the benefit of this disclosure.

At step 506, the method 500 includes performing a control operation with the external electronic device selected at step 504. In one embodiment, the control operation comprises a discovery operation. In another embodiment, the control operation comprises a pairing operation. In still another embodiment, the control operation comprises a communication operation. In embodiments where optional step 505 is included, the performance of the control operation at step 507 occurs only when the confirmation operation is detected at step 505.

At step 507, the method 500 optionally includes delivering data to the external electronic device selected at step 504. In one embodiment, this step 507 comprises delivering one or more electronic communication credentials to the external electronic device. Examples of electronic communication credentials include router passwords, network passwords, personal identification numbers (PINs), and so forth. Other examples of data that can be delivered to the external electronic device selected at step 504 will be obvious to those of ordinary skill in the art having the benefit of this disclosure.

At step 508, the method 500 optionally includes notifying the user that the control operation was performed at step 506. Where, for example, the control operation is a pairing operation, step 508 may comprise delivering an audible alert, such as a "ping" sound, which indicates the pairing operation is complete. Alternatively, step 508 could comprise delivering a text message or other alert to a companion device, such as a smartphone for example Other types of notifications suitable for use at step 508 will be obvious to those of ordinary skill having the benefit of this disclosure.

Figure 6:
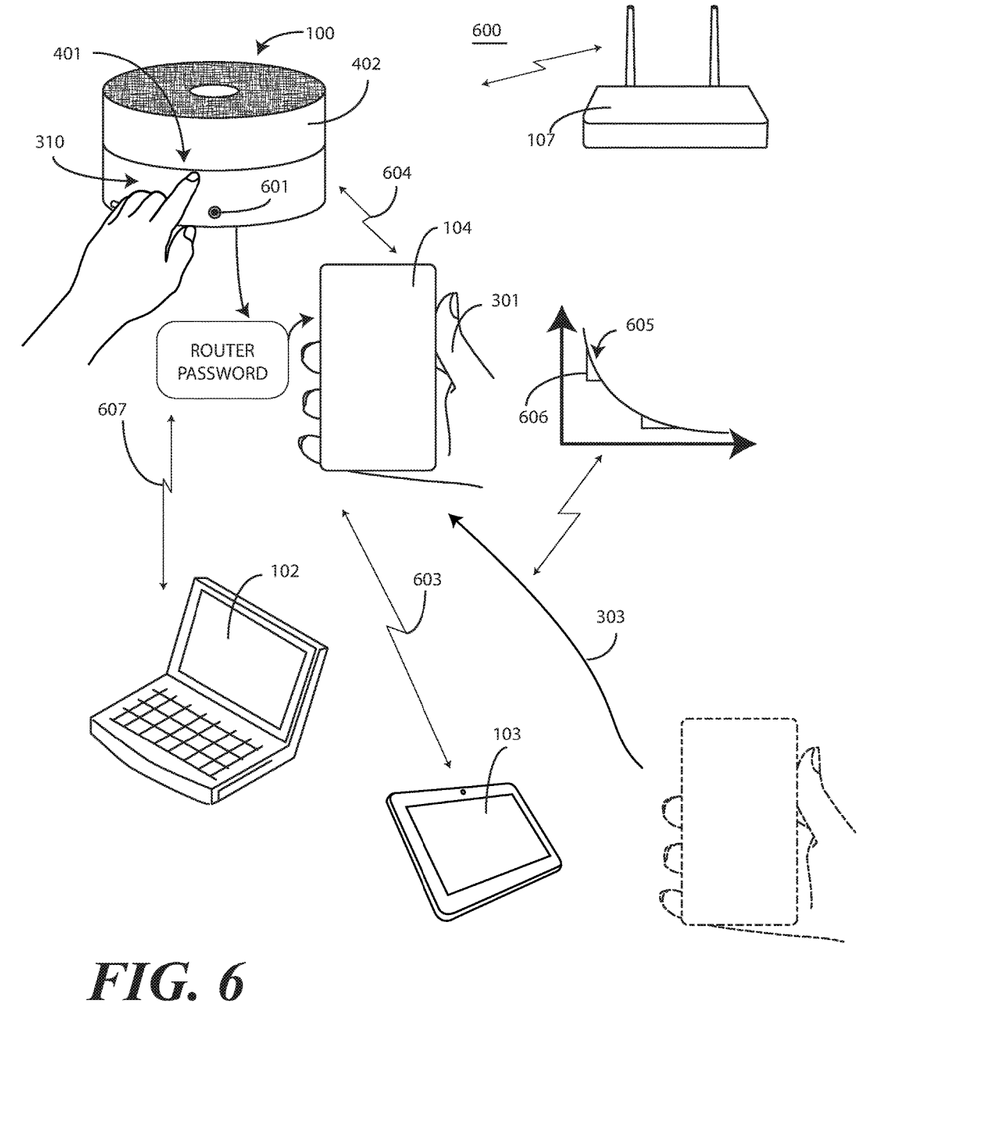
FIG. 6 illustrates one explanatory electronic device, operating in accordance with one or more method steps, each in accordance with one or more embodiments of the disclosure.

Turning now to FIG. 6, illustrated therein is an environment 600 about an electronic device 100 configured in accordance with one or more embodiments of the disclosure.

As described above with reference to FIG. 2, in one or more embodiments the electronic device 100 includes a wireless communication circuit (203) and one or more processors (201) that are operable with the wireless communication circuit (203).

In this example, a plurality of external electronic devices 102,103,104 is operating within the environment 600 of the electronic device 100. Accordingly, the wireless communication circuit (203) of the electronic device 100 receives wireless communication signals 602,603,604 from each of the external electronic devices 102,103,104. In one or more embodiments, these wireless communication signals 602, 603,604 each identify the external electronic device 102, 103,104 that transmitted them.

As described above, a power change determination circuit (210) of the electronic device 100 can then determines how much each wireless communication signals 602,603,604 changes across time. One or more processors (201) can then identify an external electronic device having a wireless communication signal experiencing the highest change in power magnitude across an amount of measured time among those being received as one with which the electronic device 100 should perform a control operation. As such, the one or more processors (201) can select a wireless communication signal 604 having a power magnitude 605 experiencing a highest amount of change 606 from the received wireless communication signals 602,603,604.

In this illustrative embodiment, the wireless communication signal 604 received from external electronic device 104 has a power magnitude 605 experiencing the highest amount of change 606 due to the fact that a user 301 is moving 303 the external electronic device 104 toward electronic device 100. The one or more processors (201) of the electronic device 100 thus select external electronic device 104 as that with which a control operation should be performed. Note that this selection is made despite the fact that the absolute power transmitted by the external electronic device 104 is less than the absolute power transmitted by other external electronic devices, such as communication hub 107.

In one embodiment, the electronic device 100 comprises one or more sensors, which are input components (207), and which are operable with the one or more processors (201). In such an embodiment, the one or more sensors detect a confirmation operation 310 after the one or more processors (201) select external electronic device 104 by detecting wireless communication signal 604 having a power magnitude 605 experiencing a highest amount of change 606. Where a confirmation operation 310 is employed, the one or more processors (201) of electronic device 100 perform the control operation only when the one or more sensors detect the confirmation operation 310.

In this illustrative embodiment, the electronic device 100 includes a touch sensor 402. In this illustrative embodiment, the confirmation operation 310 comprises receiving touch input 401 at the touch sensor.

In another embodiment, the electronic device 100 includes one or more microphones 601. Where this is the case, the confirmation operation 310 can optionally include the receipt of voice input at the one or more microphones 601. In such an embodiment, the voice input can comprise a command to perform the control operation. For example, if the control operation is a pairing operation, the command can include the phrase "PAIR!" as shown in FIG. 4.

In another embodiment, the confirmation operation 310 can include a cessation in the change in magnitude of the power being emitted by the external electronic device 104.

The user 301 can cause this by stopping the movement 303 of the external electronic device 104 when it gets close to the electronic device 100.

Regardless of whether the confirmation operation 310 is required, in one or more embodiments the one or more processors (201) of the electronic device 100 cause the wireless communication circuit (203) to perform a pairing operation with external electronic device 104, which was identified due to the wireless communication signal 604 emitted therefrom had a power magnitude 605 experiencing a highest amount of change 606. Thereafter, the one or more processors (201) of the electronic device 100 can cause the wireless communication circuit (203) to deliver one or more data messages 607 to the external electronic device 104.

Figure 7:
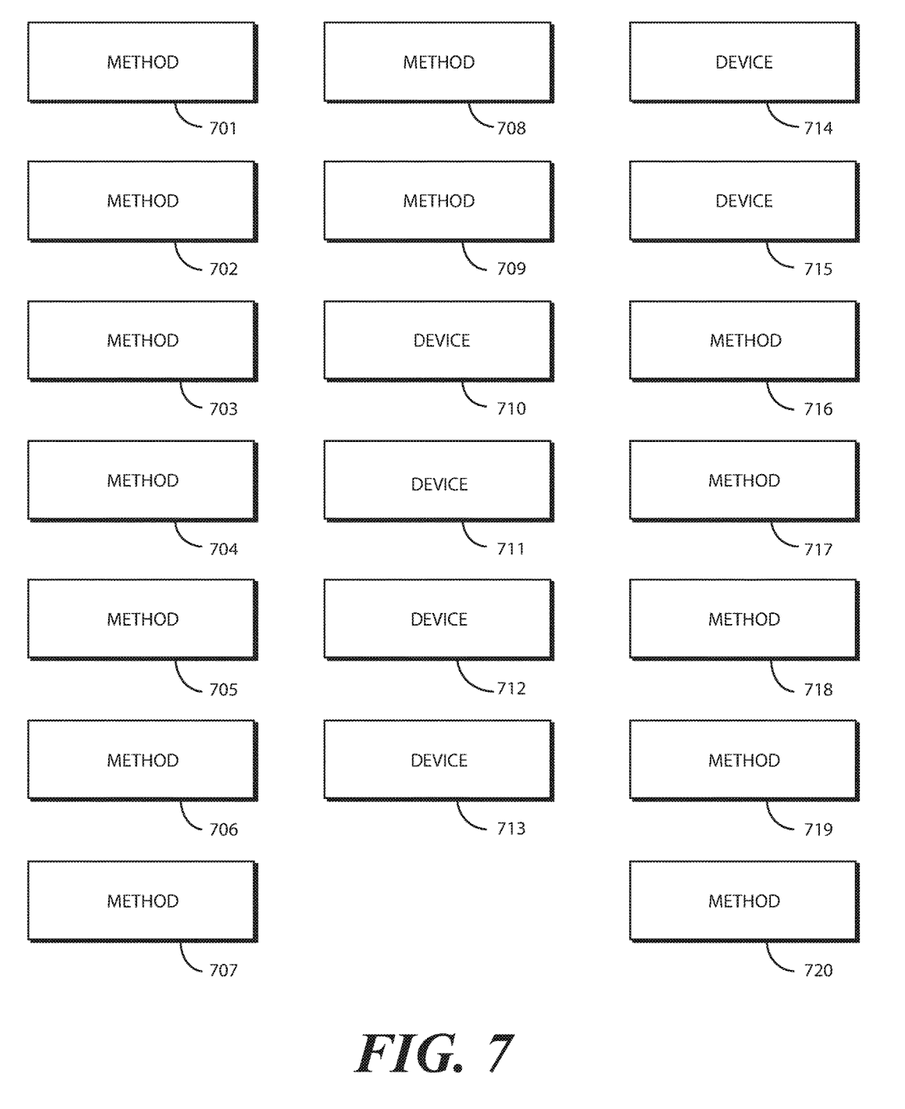
FIG. 7 illustrates one or more embodiments of the disclosure.

Turning now to FIG. 7, illustrated therein are various embodiments of the disclosure. At 701, a method comprises receiving, with a wireless communication circuit of an electronic device, one or more local area wireless communication signals from one or more external electronic devices operating within an environment of the electronic device. At 701, the method comprises determining, with one or more processors operable with the wireless communication circuit, a change in a power magnitude of one local area wireless communication signal.

At 701, the method comprises identifying, with the one or more processors, an external electronic device delivering the one local area wireless communication signal. At 701, where the change in the power magnitude is positive, the method comprises performing a pairing operation with the external electronic device.

At 702, when the power magnitudes of a plurality of local area wireless communication signals are changing, the method of 701 further comprises selecting a local wireless area communication signal experiencing a highest change from the plurality of local area wireless communication signals as the one local area wireless communication signal.

At 703, the method of 701 further comprises detecting, with one or more sensors of the electronic device, a confirmation operation after identifying the external electronic device delivering the one local area wireless communication signal. At 704, the method of 703 performs the pairing operation with the external electronic device only when the confirmation operation is detected.

At 705, the confirmation operation of 704 comprises touch input received at the electronic device. At 706, the confirmation operation of 704 comprises a cessation of the change in the power magnitude of the one local area wireless communication signal. At 707, the confirmation operation of 704 comprises audio input received at the electronic device. At 708, the method of 704 further comprises delivering one or more electronic communication credentials to the external electronic device.

At 709, a device comprises a wireless communication circuit and one or more processors operable with the wireless communication circuit. At 709, the wireless communication circuit receives one or more local area wireless communication signals identifying one or more external electronic devices operating within an environment of the device.

At 709, one or more processors select a local area wireless communication signal having a power magnitude experiencing a highest amount of change from the one or more local area wireless communication signals. At 709, the one or more processors perform a pairing operation with an external device identified by the local area wireless communication signal.

At 710, the device of 709 further comprises one or more sensors operable with the one or more processors. At 710, the one or more sensors detect a confirmation operation after the one or more processors select the local area wireless communication signal. At 710, the one or more processors perform the pairing operation only when the one or more sensors detect the confirmation operation.

At 711, the one or more sensors of 710 comprise a touch sensor. At 711, the confirmation operation comprises a receipt of touch input at the touch sensor.

At 712, the one or more sensors of 710 comprise one or more microphones. At 712, the confirmation operation comprises a receipt of voice input at the one or more microphones. At 731, the voice input comprises a command to perform the pairing operation.

At 714, the conformation operation of 710 comprises a cessation of change in the power magnitude. At 715, the one or more processors of 710 further cause the wireless communication circuit to deliver one or more data messages to the external device.

At 716, a method comprises receiving, with a wireless communication circuit of an electronic device, one or more local area wireless communication signals from one or more external electronic devices operating within an environment of the electronic device. At 716, the method comprises determining, with one or more processors operable with the wireless communication circuit, changes in power magnitudes of one or more local area wireless communication signals.

At 716, the method comprises selecting a local area wireless communication signal experiencing a highest change in power magnitude. At 716, the method comprises identifying, with the one or more processors, an external electronic device delivering the local area wireless communication signal. At 716, the method comprises performing a pairing operation with the external electronic device.

At 717, the method of 716 further comprises receiving touch input at a sensor of the electronic device. At 717, the performing of the pairing operation occurs after receipt of the touch input.

At 718, the method of 716 further comprises receiving voice input at a sensor of the electronic device. At 718, the performing of the pairing operation occurs after receipt of the voice input.

At 719, the method of 716 further comprises delivering network communication credentials to the external electronic device. At 720, the electronic device of 716 is devoid of a display.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method, comprising:
   receiving, with a wireless communication circuit of an electronic device, one or more local area wireless communication signals from one or more external electronic devices operating within an environment of the electronic device;
   determining, with one or more processors operable with the wireless communication circuit, a change in a power magnitude of one local area wireless communication signal;
   identifying, with the one or more processors, an external electronic device delivering the one local area wireless communication signal;
   detecting, with one or more sensors of the electronic device, a confirmation operation after identifying the external electronic device delivering the one local area wireless communication signal; and
   where the change in the power magnitude is positive, performing a pairing operation with the external electronic device.

2. The method of claim 1, wherein the power magnitudes of a plurality of local area wireless communication signals are changing, further comprising selecting a local wireless area communication signal experiencing a highest change from the plurality of local area wireless communication signals as the one local area wireless communication signal.

3. The method of claim 1, wherein the confirmation operation is required to perform the pairing operation with the external electronic device.

4. The method of claim 1, the performing the pairing operation with the external electronic device occurring only when the confirmation operation is detected.

5. The method of claim 1, the confirmation operation comprising touch input received at the electronic device.

6. The method of claim 1, the confirmation operation comprising a cessation of the change in the power magnitude of the one local area wireless communication signal.

7. The method of claim 1, the confirmation operation comprising audio input received at the electronic device.

8. The method of claim 1, further comprising delivering one or more electronic communication credentials to the external electronic device.

9. A device, comprising:
   a wireless communication circuit;
   one or more processors operable with the wireless communication circuit; and
   one or more sensors operable with the one or more processors;
   the wireless communication circuit receiving one or more local area wireless communication signals identifying one or more external electronic devices operating within an environment of the device;
   the one or more sensors detecting a confirmation operation after the one or more processors select the local area wireless communication signal;
   the one or more processors selecting a local area wireless communication signal having a power magnitude experiencing a highest amount of change from the one or more local area wireless communication signals and performing a pairing operation with an external device identified by the local area wireless communication signal only when the one or more sensors detect the confirmation operation.

10. The device of claim 9, the confirmation operation comprising a stoppage of motion of the external device identified by the local area wireless communication signal.

11. The device of claim 9, the one or more sensors comprising a touch sensor, the confirmation operation comprising a receipt of touch input at the touch sensor.

12. The device of claim 9, the one or more sensors comprising one or more microphones, the confirmation operation comprising a receipt of voice input at the one or more microphones.

13. The device of claim 12, the voice input comprising a command to perform the pairing operation.

14. The device of claim 9, the confirmation operation comprising a cessation of change in the power magnitude.

15. The device of claim 9, the one or more processors further causing the wireless communication circuit to deliver one or more data messages to the external device.

16. A method, comprising:
receiving, with a wireless communication circuit of an electronic device, one or more local area wireless communication signals from one or more external electronic devices operating within an environment of the electronic device;
determining, with one or more processors operable with the wireless communication circuit, changes in power magnitudes of one or more local area wireless communication signals;
selecting a local area wireless communication signal experiencing a highest change in power magnitude;
identifying, with the one or more processors, an external electronic device delivering the local area wireless communication signal;
receiving one of touch input or voice input at a sensor of the electronic device; and
performing a pairing operation with the external electronic device after the receiving the one of the touch input or the voice input.

17. The method of claim 16, the receiving the one of the touch input or the voice input comprising receiving the touch input at a touch sensor of the electronic device.

18. The method of claim 16, the receiving the one of the touch input or the voice input comprising receiving the voice input at an audio sensor of the electronic device.

19. The method of claim 16, further comprising delivering network communication credentials to the external electronic device.

20. The method of claim 16, the electronic device devoid of a display.

* * * * *